United States Patent [19]

Herr et al.

[11] Patent Number: 4,549,744

[45] Date of Patent: Oct. 29, 1985

[54] QUICK COUPLER LATCH

[75] Inventors: Herbert W. Herr, Waterloo; Seaton Moon, Cedar Falls; James E. Hopper, Waterloo, all of Iowa

[73] Assignee: Deere & Company, Moline, Ill.

[21] Appl. No.: 642,476

[22] Filed: Aug. 20, 1984

[51] Int. Cl.⁴ ............................................. B60D 1/04
[52] U.S. Cl. ................................ 280/415 A; 172/272; 172/439; 280/461 A
[58] Field of Search .......... 280/415 A, 461 A, 460 A, 280/456 A, 479 R, 477; 172/272, 439, 667

[56] References Cited

U.S. PATENT DOCUMENTS

| | | | |
|---|---|---|---|
| 2,979,137 | 11/1961 | Hess | 172/272 |
| 3,116,075 | 12/1963 | Hershman et al. | 280/479 R |
| 3,172,686 | 3/1965 | Beard | 280/461 A |
| 3,195,651 | 7/1965 | Todd | 172/272 |
| 3,498,638 | 3/1970 | Magruder | 280/479 R |
| 3,531,140 | 9/1970 | Vita et al. | 280/477 |
| 3,539,203 | 11/1970 | Baugh | 280/504 |
| 3,544,133 | 12/1970 | Lemmon et al. | 280/479 R |
| 3,716,253 | 2/1973 | Gniffke et al. | 280/415 A |
| 3,807,769 | 4/1974 | Thompson et al. | 280/479 R |
| 3,829,128 | 8/1974 | Sutton et al. | 280/461 A |
| 4,019,753 | 4/1977 | Kestel | 280/415 A |
| 4,415,175 | 11/1983 | Kainer | 280/460 A |

Primary Examiner—John A. Pekar

[57] ABSTRACT

A quick coupler latch mechanism includes a latch pivoted on a quick coupler frame above a hook having a recess. A guide pin extends horizontally through the frame and is supported by thickened frame parts to resist bending deformation of the guide pin. An operator-controlled lever device moves a control bar within the frame. A guide member is rigidly fixed for movement with the lower end of the control bar and has a recess which slidably receives the guide pin. The guide member operatively engages the latch to pivot it between open and closed positions.

10 Claims, 4 Drawing Figures

QUICK COUPLER LATCH

BACKGROUND OF THE INVENTION

The present invention relates to a quick coupler for coupling an implement to a tractor, and more particularly relates to an improved latching mechanism therefor.

Commercially available quick couplers, such as described in U.S. Pat. No. 3,544,133, have a pair of laterally spaced-apart hooks, each with a latching mechanism for releasably holding an implement hitch pin in the hook. The latching mechanism typically includes a latch coupled to an operating bar by one or more pivotal links.

If the operator moves such a quick coupler backwards against an implement while inadvertently leaving the latch in the locked position, then a large force may be applied laterally in the forward direction to the latch due to engagement of the hitch pin with the exposed and locked latch. In some known quick coupler latch mechanisms, this loading force could cause a bending deformation of the control bar or of the links and pivot pins which connect the latch to the control bar.

Such bending failures are undesirable because they may not be noticeable upon an inspection of the exterior of the device. Then, if such a damaged device is put in service, it may fail to latch properly at one side of the quick coupler. If this happens, then the hitch pin can be forced out of the damaged side and the resulting twisting load on the other (undamaged) coupler side can create costly damage to the structural parts on the undamaged side of the coupler frame. One response to this problem has been the introduction of self-opening latch mechanisms, such as described in U.S. Pat. No. 3,807,769 and in U.S. Pat. No. 3,531,140. However, such self-opening latch mechanisms are more complicated and costly than the simpler, non-self-opening types. Accordingly, it would be desirable to provide a simple, quick coupler latch mechanism which is resistant to bending failures.

SUMMARY OF THE INVENTION

An object of the present invention is to provide a quick coupler latch mechanism which resists part bending failures.

This and other objects are achieved by the present invention which consists of a latch mechanism for a quick coupler having an inverted U-shaped frame with a pair of downward, depending legs. Each leg has a rearward extending hook with an upward opening recess therein and a latch mechanism for releasably holding an implement hitch pin in the recess. Each latch mechanism has a latch pivoted about a pivot pin fixed with respect to the leg above the hook. A guide pin extends laterally through the leg. A control bar is movable up and down by means of a known lever mechanism. A guide member is rigidly fixed to a lower end of the control bar and has a slot which slidably receives the guide pin. The guide member engages the latch so that vertical movement of the control bar and guide member causes the latch to pivot about the pivot pin in and out of its locked position. The guide pin is positioned below and forward of the pivot pin so that forward directed loads on the locked latch are primarily absorbed by the guide pin, rather than transmitted to the pivot pin and the control bar. The guide pin is supported by thickened wall portions of the quick coupler leg and the guide member and guide pin are sized so as to resist bending deformation.

DETAILED DESCRIPTION

Figure 1:
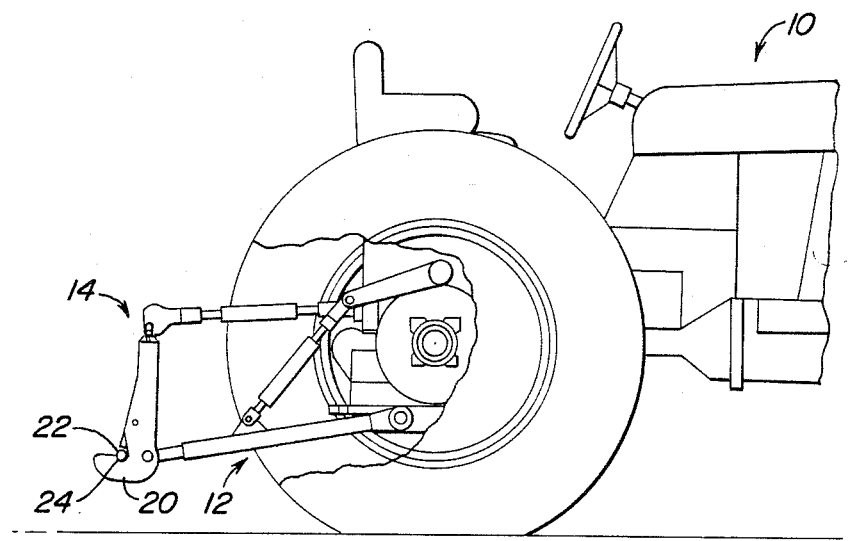
FIG. 1 is a side view of the rear portion of a tractor with a quick coupler attached thereto.

As shown in FIG. 1, a tractor 10 includes a known hitch assembly 12 which supports the quick coupler 14 of the present invention.

Figure 2:
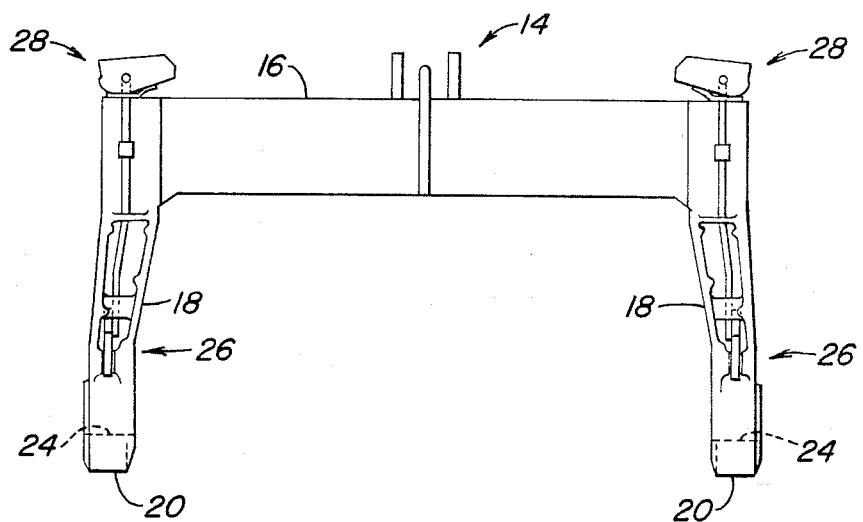
FIG. 2 is a rear view of a quick coupler, including the present invention.

Referring now to FIG. 2, the quick coupler 14 includes an inverted, generally U-shaped member which has a transverse bight portion 16 and a pair of depending legs 18. The legs 18 depend from the outer ends of bight 16, are formed integrally therewith and have side walls 17 and 19 (best seen in FIG. 4). The lower portions of legs 18 have rearwardly extending and upwardly opening hooks 20 which are adapted to receive the lower hitch pins 22 of an associated implement (not shown). The hitch pins 22 are releasably held in the hook recesses 24 by the applicants' latching mechanism 26, operated by a known lever mechanism 28 positioned at the top of each leg 18. A suitable lever mechanism is described in detail in U.S. Pat. No. 3,544,133.

Figure 3:
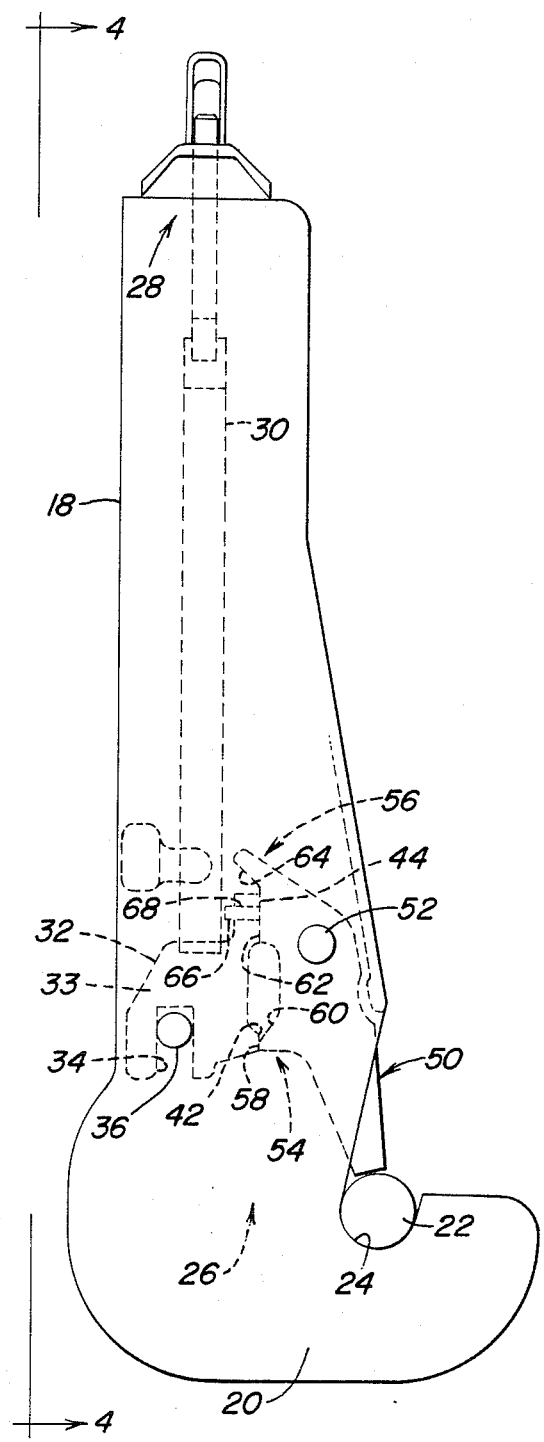
FIG. 3 is an enlarged side view of an end portion of the quick coupler showing the present latch mechanism invention.
Figure 4:
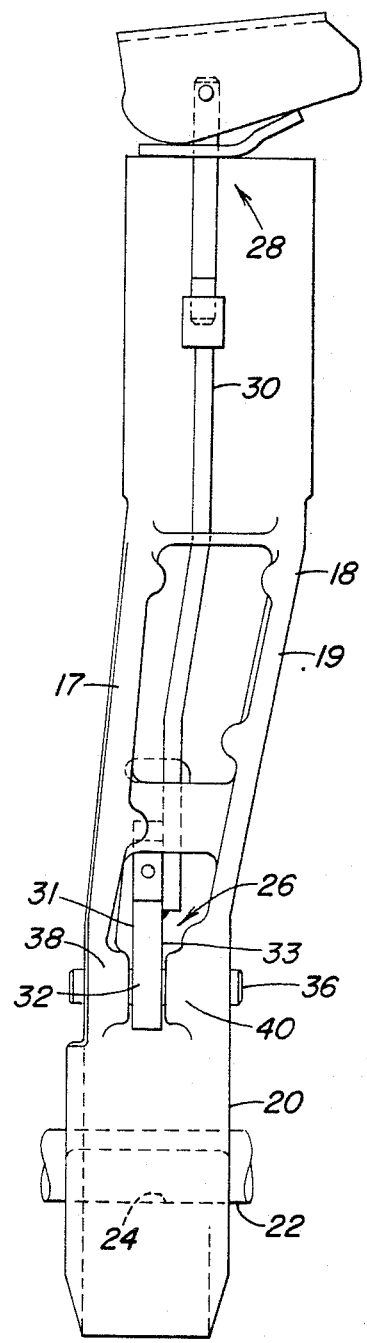
FIG. 4 is a view along lines 4—4 of FIG. 3.

Referring now to FIGS. 3 and 4, the latching mechanism 26 includes a control bar 30 with an upper end threadably coupled to the known lever mechanism 28. The lower end of the bar 30 is rigidly fixed, such as by welding, to a guide member 32. Guide member 32 has oppositely facing sides 31 and 33 and a guide slot 34 which extends substantially parallel to the longitudinal axis of bar 30. Slot 34 receives guide pin 36 so that the guide member 32 can slide vertically with respect thereto. The guide pin 36 extends transversely through bores in opposite sidewall portions 38, 40 of the leg 18. Snap rings preferably hold guide pin 36 in place. The guide member 32 is disposed between wall portions 38 and 40 and has a thickness which makes it resistant to bending deformation. The guide member 32 further includes generally rearwardly extending latch engaging surfaces 42 and 44.

Latch 50 is pivotally supported near its upper end on the frame 18 by pivot pin 52. The pivot pin 52 is positioned to the rear and above guide pin 36. The lower end of latch 50 is adapted to engage and releasably hold the hitch pin 22 in the hook recess 24. Latch 50 has guide engagement arms 54 and 56. Arm 54 forms a pair of engagement or cam surfaces 58, 60 which are joined together to form an obtuse angle, preferably of 145 degrees, interior to the latch 50. Surfaces 58 and 60, therefore, also form a reflex angle of 215 degrees therebetween, exterior to the latch 50. Arm 56 forms a pair of engagement or cam surfaces 62 and 64 which are also joined together to form an obtuse angle, preferably of 130 degrees, exterior to latch 50. A set screw 66 is threadably received in a bore 68 in guide member 32 to provide an adjustable stop which can control the locked position of latch 50.

Mode of Operation

The mechanism 26 shown in FIG. 3 is in its locked position wherein the lower end of latch 50 in the conventional manner prevents removal of hitch pin 22 from hook recess 24. Latch 50 is maintained in this position by the engagement of latch surface 58 with guide member surface 42.

To release pin 22 from the hook 20, the control bar 30 is moved upwardly by lifting the known lever mechanism 28. This moves guide member 32 upward so that guide member surface 42 slides along latch surfaces 58 and 60 and so that guide member surface 44 engages latch surface 64, thus pivoting latch 50 clockwise, viewing FIG. 3. This moves the lower end of latch 50 to the left and permits pin 22 to be removed from hook recess 24.

To lock pin 22 in the hook recess 24, the control bar 30 is moved downward by lowering the known lever mechanism 28. This lowers guide member 32 so that surface 42 engages latch surface 60 and pivots latch 50 counterclockwise back to the locked position on surface 58 shown in FIG. 3, wherein the lower end of latch 50 again prevents removal of pin 22 from recess 24.

When in the locked position, this latch mechanism is resistant to bending deformation. One reason is that the latch 50 and the guide member 32 are relatively thick and are more resistant to bending than are the relatively thin connecting links used in the latch mechanism described in U.S. Pat. No. 3,544,133. Furthermore, as best seen in FIG. 4, the guide pin 36 in the present invention is supported by wall portions 38 and 40 which are substantially thicker in the vicinity of the guide pin 36 than in other areas of the sidewalls 17 and 19 of the leg 18. Note that the separation between wall portions 38 and 40 is only slightly larger than the thickness of guide member 32. Thus, the spaces between the opposite sides 31 and 33 of guide member 32 and the corresponding adjacent wall portions 38 and 40 are substantially smaller than the diameter of guide pin 36. Also, the thickness of wall portions 38 and 40 is larger than the diameter of guide pin 36. These dimensional relationships all contribute to preventing bending of the guide pin 36. Furthermore, the load is transmitted from latch 50 to guide pin 36 by guide member 32, thus reducing loading of the pivot pin 52 and of the control bar 30.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a quick coupler having a frame with a hook having a hitch pin receiving recess therein, and a latch pivotally supported by the frame and movable to open and closed positions in response to movement of an operator-movable control bar, the improvement wherein:

a guide member resistant to bending deformation is rigidly fixed to and movable with a lower end of the control bar, the guide member having a guide slot therein, and having at least one latch engaging part;

a guide pin extending horizontally through the frame and slidably received by the guide slot, the frame including support means for supporting the guide pin and for substantially preventing bending deformation of the guide pin; and the latch having at least one guide member engaging surface engageable with the at least one latch engaging part, the at least one latch engaging part and the at least one cam surface cooperating so that sliding of the guide member with respect to the guide pin causes pivoting of the latch between its open and closed positions.

2. The invention of claim 1, wherein:

the at least one latch engaging part of the guide member includes an adjustable spacing member adjustably supported by the latch engaging part, the spacing member being engageable with the at least one cam surface of the latch to adjust the closed position of the latch.

3. The invention of claim 1, wherein:

the guide member has first and second latch engaging parts; and the latch has first and second pairs of cam surfaces, each pair having cam surfaces comprising first and second planar surfaces joined to each other at an obtuse angle, the first pair of cam surfaces being engageable with the first latch engaging part of the guide member, the second pair of cam surfaces being engageable with the second latch engaging part of the guide member.

4. The invention of claim 3, wherein:

the obtuse angle defined by the first and second planar surfaces of the first pair of cam surfaces is interior to the latch.

5. The invention of claim 3, wherein:

the obtuse angle defined by the first and second planar surfaces of the second pair of cam surfaces is exterior to the latch.

6. The invention of claim 3, wherein:

the obtuse angle defined by the first and second planar surfaces of the first pair of cam surfaces is interior to the latch; and the obtuse angle defined by the first and second planar surfaces of the second pair of cam surfaces is exterior to the latch.

7. The invention of claim 6, wherein:

the first pair of cam surfaces is positioned below the second pair of cam surfaces.

8. The invention of claim 1, wherein:

the latch has a first pair of guide member engaging cam surfaces defining therebetween a reflex angle exterior to the latch; and the latch has a second pair of guide member engaging cam surfaces defining therebetween an obtuse angle exterior to the latch.

9. A quick coupler comprising:

a frame with a hook member having a hitch pin receiving recess therein;

a latch pivotally connected to the frame and movable between an open position permitting the hitch pin to be received by and removed from the recess and a closed position preventing removal of the hitch pin from the recess;

a lever pivotally connected to an upper portion of said frame and movable between open and closed positions;

a bar having one end coupled to the lever, the bar being slidable in the frame in response to pivoting of the lever;

a horizontally extending guide pin supported by thickened wall portions of the frame so as to prevent bending deformation of the guide pin; and a guide member rigidly fixed to and movable with another end of the bar, the guide member having a slot slidably receiving the guide pin, and the guide member being engageable with the latch to pivot the latch between its open and closed positions.

10. The quick coupler of claim 9, wherein:

the guide member includes upper and lower latch engaging parts; and the latch includes upper and lower pairs of planar cam surfaces, the upper pair of cam surfaces defining an obtuse angle therebetween and being engageable with the upper latch engaging part of the guide member, the lower pair of cam surfaces defining a reflex angle therebetween and being engageable with the lower latch engaging part of the guide member, the guide member moving in one direction and engaging one of the lower pairs of cam surfaces to pivot the latch to its closed position, the guide member moving in the opposite direction and engaging one of the upper pair of cam surfaces to pivot the latch to its open position.

* * * * *